United States Patent [19]

Marx et al.

[11] Patent Number: 4,845,266

[45] Date of Patent: Jul. 4, 1989

[54] PROCESS FOR THE PREPARATION OF POLYESTER POLYOLS

[75] Inventors: Matthias Marx, Fuerstenfeldbruck, Fed. Rep. of Germany; Joachim Jaehme, Grosse Ile, Mich.; Joachim Streu, Wachenheim, Fed. Rep. of Germany

[73] Assignee: BASF Aktiengesellschaft, Ludwigshafen, Fed. Rep. of Germany

[21] Appl. No.: 36,574

[22] Filed: Apr. 10, 1987

[30] Foreign Application Priority Data

Apr. 24, 1986 [DE] Fed. Rep. of Germany ....... 3613875

[51] Int. Cl.$^4$ .................. C07C 67/08; C07C 69/80
[52] U.S. Cl. ........................ 560/91; 560/84; 560/90; 560/193; 560/198; 524/296
[58] Field of Search .............. 560/84, 88, 90, 91, 560/193, 196, 198, 98, 204

[56] References Cited

U.S. PATENT DOCUMENTS

| | | |
|---|---|---|
| 2,863,855 | 12/1958 | Wilson et al. |
| 3,459,733 | 8/1969 | Byrd et al. ............... 560/198 |
| 3,462,395 | 8/1969 | Wiener ..................... 560/198 |
| 4,582,926 | 4/1986 | Straehle et al. ............ 560/91 |

FOREIGN PATENT DOCUMENTS 0124071 4/1984 Fed. Rep. of Germany.
1286451 8/1972 United Kingdom.

Primary Examiner—Werren B. Lone
Assistant Examiner—Vera C. Clarke
Attorney, Agent, or Firm—Bill C. Panagos

[57] ABSTRACT

A process for the preparation of polyester polyols having an acid number of less than 1, a hydroxyl number of approximately 20 to about 400, and having a functionality of efficaciously 2 to 3, wherein polycarboxylic acids and/or their anhydrides and multivalent alcohols are polycondensed, preferably in the absence of common esterification catalysts, at temperatures of from about 150° to 250° C., optionally under reduced pressure, up to an acid number of from 20 to 5. The resulting polycondensate is then oxyalkylated per carboxyl group using from 1 to 5 moles of an alkylene oxide, for example 1,2-propylene oxide and/or preferably ethylene oxide, in the presence of at least one tertiary amine catalyst from the group consisting of N-methylimidazole, diazabicyclo[2,2,2]octane, diazabicyclo[5,4,0]undec-7-ene and pentamethyldiethylenetriamine and mixtures thereof, in a quantity of from about 0.001 to 1.0 weight percent based on the weight of the polycondensate, at temperatures from about 100° to 170° C. and under a pressure of about 1 to 10 bar.

17 Claims, No Drawings

PROCESS FOR THE PREPARATION OF POLYESTER POLYOLS

BACKGROUND OF THE INVENTION

1. Field of the Invention

The present invention relates to the preparation of polyester polyols having an acid number less than 1 in a shorter time in comparison to the usual processes; i.e., in higher volume-time-yields.

The present invention further relates to the molten state condensation of polyester-polyol-initial components and the subsequent oxyalkylation of the polycondensates obtained in the presence of special catalysts.

2. Description of the Material Art

Polyester polyols are commonly prepared from polycarboxylic acids and multivalent alcohols through molten state condensation in the presence of acids or metal salts used as catalyst. The polycondensation is preferably carried out under reduced pressure, in order to distill off the water resulting from the condensation from the reaction mixture and to move the equilibrium reaction in the direction of polyether formation. In this manner, for example polyester polyols having acid numbers larger than 5, can be prepared in relatively short reaction times.

However, in many applications, such as in the preparation of polyurethanes, it is necessary that the polyester polyols exhibit uniform molecular weights and low acid numbers. In the preparation of polyester polyols having acid numbers less than 2, and especially less than 1, not only are both long reaction times and high reaction temperatures required, but a further disadvantage is also that the products are darkly colored based on the decomposition reactions, and when reacting with isocyanates they have varying reaction times. In order to overcome these disadvantages, it was proposed to carry out the condensation in the presence of catalysts; for example, iron, cadmium, cobalt, lead, zinc, antimony, magnesium, titanium and tin catalysts, in the form of metals, metal oxides or salts. These compounds, however, not only catalyze the polyester preparation, but also accelerate the hydrolytic decomposition of the polycondensation products in the presence of moisture in the air. Another disadvantage is that the catalyst residues contained in the polyester polyols used in the preparation of polyurethanes, can interfere by forming side reactions, such as allophanate or biuret formation, isocyanate trimerization and isocyanate polymerization, or by addtional catalysis or by hindering the polyaddition.

The process for preparing polyester polyols and their use for the preparation of polyurethane plastics using the polyisocyanate addition polymerization process is well known, and has been described in numerous literature and patent publications. Specifically, reference is made to the *Plastics Handbook*, vol. 7, *Polyurethanes*, 1st edition, 1966, published by A. Höchtlen and R. Vieweqs, and the 2nd edition in 1983, published by G. Oertel, Carl Hanser-Verlag, Munich, Vienna.

As disclosed in U.S. Pat. No. 3,907,863, (DE-OS No. 2 316 293) polyester polyols having acid numbers less than 1 can be prepared without catalysts in relatively high volume-time-yields. According to this process, polycarboxylic acids and multivalent alcohols are polycondensed at temperatures from about 150° to 350° C., whereby distillable dialcohols or mixtures comprised of di- and monoalcohols with acid numbers less than 480, and monoalcohols with an acid number less than 60, are incorporated into the esterification mixture. The polycondensation is carried out to the end, while, at the same time, the excess alcohol is removed by distillation. Through the use of mono-alcohols, the acid number and functionality of the polyester polyol can be decreased.

As disclosed in DE-AS No. 1 248 660 (GB 1 139 634), glycol monoesters can be prepared through the esterification of organic mono- and polycarboxylic acids with ethylene oxide in the presence of thio-ethers which are used as catalysts. In U.S. Pat. No. 4,452,997, (EP-PS No. 0 087 517), a process is described for the preparation of polyester- and/or polyesterpolyether polyols in which di- through hexafunctional polyether polyols having hydroxyl numbers of from 30 to 200, are reacted with at least 1 carboxylic acid anhydride to form a carboxylic-semi-ester. This is then oxyalkylated with at least 1 alkylene oxide in the presence of 0.001 to 0.1 moles of from at least 1 thio-dialkylene glycol per carboxyl group of the carboxylic semi-ester. EP-OS 0 124 070 discloses an improvement over the above process by the reaction of di- through hexafunctional polyester polyols having hydroxyl numbers from 15 to 250, with at least 1 carboxylic acid anhydride, in the presence of N-methylimidazole, triethylenediamine, and/or triphenylphosphine. The resulting carboxylic semi-ester is oxyalkylated with at least 1 alkylene oxide in the presence of N-methylimidazole, triethylenediamine, triphenylphosphine, thiodialkylene glycol, or a mixture comprising at least two of the said compounds, which are used as catalysts.

None of the aforementioned European or U.S. patents and/or disclosures disclose the rapid reduction of the acid number of polyester polyols prepared through molten state condensation. Accordingly, the present invention differs from the art listed herein.

SUMMARY OF THE INVENTION

This invention comprises processes and compositions made by the molten state condensation of polyester-polyol-initial components and the subsequent oxyalkylation of the polycondensates obtained in the presence of special catalysts.

The process of the present invention for the preparation of polyester polyols having an acid number less than about 1 is carried out by (a) the molten state condensation of at least one polycarboxylic acid and/or its anhydride and at least one multivalent alcohol, to obtain a polycondensate, and (b) oxyalkylation of the polycondensate obtained wherein (i) the esterification mixture (a) is polycondensed up to an acid number from about 20 to 5, and (ii) the resulting polycondensate (b) is oxyalkylated with an alkylene oxide in the presence of a tertiary amine catalyst selected from the group consisting of N-methylimidazole, diazabicyclo[2,2,2]octane, diazabicyclo[5,4,0]undec-7-ene and pentamethyl diethylenetriamine, and mixtures thereof.

According to the present invention, polyester polyols are obtained having improved color quality with relatively lower reaction temperatures in clearly shorter preparation times. In the presence of the said tertiary amine catalysts used, the carboxyl groups of the intermediate forming polycondensates are selectively carboxylated with smaller amounts of alkylene oxide. Depending on the type of alkylene oxide used, either exclusively primary hydroxyl groups result when using ethylene oxide, or predominantly secondary hydroxyl groups result when using 1,2-propylene oxide; the reactivity of the desired polyester polyol can be adjusted. The tertiary amine catalysts remaining in small quantities in the polyester polyol do not adversely influence the subsequent polyisocyanate addition polymerization in the preparation of polyurethanes.

In the preparation of polyester polyols having an acid number less than about 1, the common organic carboxylic acid and/or their anhydrides and multivalent alcohols are used.

Suitable common organic carboxylic acids are selected from the group consisting of aromatic dicarboxylic acids or dicarboxylic acid anhydrides, such as phthalic acid, phthalic anhydride, isophthalic acid, isophthalic anhydride, terephthalic acid, terephthalic anhydride, and mixtures thereof; cycloaliphatic dicarboxylic acids, such as the isomeric cyclohexane dicarboxylic acids, their corresponding anhydrides and mixtures thereof, and preferably aliphatic dicarboxylic acids having from about 2 to 12 carbon atoms, preferably from about 4 to 6 carbon atoms in the alkylene radical, such as, dodecanedioic acid, sebacic acid, azelaic acid, subaric acid, pimelic acid, adipic acid, glutaric acid, succinic acid, succinic anhydride, malonic acid, and oxalic acid, their anhydrides, and mixtures thereof. Preferably used are mixtures comprised of succinic, glutaric and adipic acids, preferably in weight ratios of from about 20 to 35; 35 to 50; 20 to 32. Adipic acid is the most preferred aliphatic dicarboxylic acid. For many areas of application it may be desirable to modify the polyester polyols with higher functional carboxylic acids or carboxylic anhydrides, such as, tricarboxylic acids such as trimellitic acid, and mixtures thereof or olefinic unsaturated dicarboxylic acid and/or dicarboxylic acid anhydrides, such as, fumaric acid, maleic acid or maleic anhydride, and mixtures thereof.

Suitable multivalent alcohols are selected from the group consisting of optionally substituted, olefinic unsaturated or those containing ether bridges, branched or preferably linear, aliphatic di-alcohols having from about 2 to 12 carbon atoms, preferably from about 2 to 6 carbon atoms, such as 1,4-butenediol, diethylene glycol, dipropylene glycol, triethylene glycol, tripropylene glycol, 2,2-dimethyl-1,3-propanediol, 1,3 butylene glycol, 2,2,4-trimethyl-1,6-trimethyl-hexanediol, ethanediol, and/or 1,2-, 1,3-propanediol, 1,4-butanediol, 1,5-pentanediol, 1,6-hexanediol, 1,8-octanediol, 1,10-decanediol and 1,12 dodecanediol and mixtures thereof. For the preparation of higher functional polyester polyols, optionally, tri- and higher valent alcohols, i.e. glycerin, trimethylolethane, and mixtures thereof can be used at the same time. In addition, in the preparation of mixed polyester polyols, mixtures of different organic polycarboxylic acids and/or polycarboxylic anhydrides and multivalent alcohols can be used. The preferred aliphatic di-alcohols are: 1,2-ethanediol, 1,3-propanediol, 1,4-butanediol, 1,5-pentanediol, 1,6-hexanediol, and 2,2-dimethyl-1,3-propanediol and mixtures thereof.

In the preparation of polyester polyols, the polycarboxylic acids and/or their anhydrides and multivalent alcohols are condensed up to an acid number of from about 20 to 5, preferably of from about 15 to 10, in a ratio of the carboxyl groups to the hydroxyl groups of from about 1:1 to 1.4, preferably from about 1:1.05 to 1.2, respectively, in a ratio of the anhydride groups to the hydroxyl groups of from about 1:2 to 2.8, preferably from about 1:2.05 to 2.4 in the molten state at temperatures from about 150° to 250° C., preferably from about 160° to 250° C., and especially from about 200° to 220° C., and optionally under reduced pressure in the presence of an esterification catalyst such as tin salts disclosed in U.S. Pat. No. 3,162,616, incorporated herein by reference, or tetrabutylorthotitanate and mixtures thereof, or preferably in the absence of esterification catalysts. Following a preferred protocol, the esterification mixture is polycondensed at a temperature of from about 160° to 250° C., up to an acid number of from about 80 to 30, and preferably from about 40 to 30, under normal pressure and subsequently up to the said acid numbers of about 20 to 5, under a pressure less than about 500 mbar, preferably of from about 50 to 150 mbar.

In carrying out this invention and achieving the advantages associated therewith, it is essential that the molten state condensation not be broken off too early, and that it be carried out up to an acid number of about 20 or less. For example, if one carries out the oxyalkylation with an acid number of about 25 or greater, the water content of the esterification mixture will be unduly large. Nevertheless, a higher water content brings about the hydrolysis of the alkylene oxides. Subsequently, oxyalkylation of the divalent alcohols formed results in polyoxyalkylene diols. A change in the equilibrium of the final products is associated with an increased quantity consumption of the final products. To this end, separation of these products is optionally desired, as in the case where the polyester polyols and the polyoxyalkylene diols formed as a result of the process are not indefinitely miscible. Those skilled in the art understand that the esterification mixture can also be polycondensed up to an acid number less than about 5 without having the disadvantages show up in the subsequent oxyalkylation because of a high water content. However, since acid numbers in a range of less than about 10 are always reduced more slowly, longer polycondensation times are required so that a significant shortening of the polycondensation time results as related to the higher volume time yield.

As soon as the esterification mixture has achieved an acid number of from about 20 to 5, the atmosphere over the polycondensate in the reaction vessel is made inert by introducing at least one inert gas under the reaction conditions. For example, the atmosphere is made inert by perfusion of the esterification mixture and by replacing the atmosphere containing moisture. Examples of inert gases used are noble gases, such as helium or argon, or mixtures thereof. Another inert gas which is preferred is nitrogen. Before, during, and/or after the atmosphere is made inert, the polycondensate obtained is cooled down to the reaction temperature for oxyalkylation, which is from about 100° to 170° C., and preferably from about 150° to 160° C.

As disclosed herein, the polycondensate obtained by the molten state condensation of at least one polycarboxylic acid and/or its anhydrides and at least one multivalent alcohol is further oxyalkylated with an alkylene oxide in the presence of at least one tertiary amine catalyst selected from the group consisting of N-methylimidazole, diazabicyclo[2,2,2]octane, diazabicyclo[5,4,0]undec-7-ene and pentamethyldiethylenetriamine and mixtures thereof. Preferred tertiary amine catalysts are diazabicyclo[5,4,0]-undec-7-ene and/or pentamethyl-diethylenetriamine. The catalysts are used in as small as catalytically effective amounts possible because of cost considerations and also to prevent possible influence of the subsequent polyisocyanate addition polymerization reaction. The catalyst is effective when present in quantities of from about 0.001 to 1 weight percent, preferably from about 0.001 to 0.1 weight percent, and most preferably from about 0.001 to 0.4 weight percent, based on the weight of the polycondensate.

Useful as oxyalkylation agents for the carboxyl groups are 1,2-propylene oxide, mixtures consisting of 1,2-propylene oxide and ethylene oxide and preferably ethylene oxide. From about 1 to 5 moles, and preferably from about 1.05 to 1.5 moles of alkylene oxide are used per carboxyl group of the polycondensate. The alkylene oxides can be added to the polycondensate proportionally or continuously in gas form. However, the alkylene oxides are preferably incorporated into the polycondensate continuously in liquid form. The oxyalkylation reaction is conducted at a temperature of from about 150° to 160° C. and under a pressure of from about 1 to 10 bar, preferably of from about 2 to 3.5 bar. After achieving an acid number of less than about 1, which commonly requires reaction times of about 0.5 to 4 hours and preferably from about 1 to 2 hours, the oxalkylation is completed. If the polycondensate mixture still contains free monomeric alkylene oxide, it is distilled off under reduced pressure.

The polyester polyols prepared according to the process claimed herein possess an acid number of less than about 1, preferably of from about 0.2 to 0.8, a hydroxyl number of from about 20 to 400, preferably from about 40 to 70 and have a functionality of from about 2 to 3. For reducing the acid number of from about 20 to 5 to less than about 1, on the average 1 mole of alkylene oxide is esterified per carboxyl group. The polyester polyols are particularly useful for the preparation of polyurethanes, such as polyurethane cellular plastics or elastomers, made by using the polyisocyanate addition polymerization process.

COMPARATIVE EXAMPLE A 92.28 parts by weight of adipic acid, 28.94 parts by weight of ethanediol, and 20.99 parts by weight of 1,4butanediol were mixed together and while stirring at 210° C. in the presence of 10 ppm of tin dioctoate used as an esterification catalyst, first at normal pressure and then following achieving an acid number of 30, was esterified under a pressure of 60 mbar. Following a polycondensation time of 24 hours, a mixed adipate polyester of ethylene glycol and 1,4-butanediol which had a hydroxyl number of 55.2, an acid number of 0.8, a viscosity of 650 mPas at 75° C., and an iodine color number of from 1 to 2 was obtained.

EXAMPLE 1

94.87 parts by weight of adipic acid, 28.11 parts by weight ethanediol, and 20.40 parts by weight of 1,4-butanediol were esterified up to an acid number of 13.5 analogous to the specifications of Comparative Example A. In this instance, a polycondensation time of about 10 hours was required.

Subsequently, the polycondensation mixture obtained was allowed to cool down to 150° C., the atmosphere was made inert using nitrogen at a pressure of 3.5 bar, and 0.0285 parts by weight of methylimidazol (0.03 weight percent based on the polycondensate) was added to the polycondensation mixture while stirring. Following this, within 20 minutes 1.2 parts by weight of liquid ethylene oxide (1.05 moles per mole of carboxyl group) was incorporated into the reaction mixture. The pressure increase formed as a result of this, which was about 6 bar, fell within 2 hours to the initial value of 3.4 bar. While the polyester polyol was degassed at 50 to 10 mbar, it was allowed to cool down to the filling temperature of 85° C. Following a polycondensation time and ethoxylation time of a total of 12 hours, the resulting mixed adipate polyester of ethylene glycol and 1,4-butanediol had a hydroxyl number of 51.8, an acid number of 0.8, a viscosity at 25° C. of 780 mPas and an iodine color number of 1.

EXAMPLES 2 THROUGH 9 AND COMPARATIVE EXAMPLES B-C

An esterification mixture consisting of 84.87 parts by weight of adipic acid, 28.11 parts by weight of ethylene glycol, and 20.40 parts by weight of 1,4 butanediol was polycondensed while stirring in the absence of an esterification catalyst at 210° C., first at normal pressure then following achieving an acid number of 35 under a pressure of 100 mbar until an acid number of 13.5 resulted. The polycondensation time was 10 hours.

The polycondensate obtained was allowed to cool to the oxyalkylation temperature, the atmosphere was made inert using nitrogen under a pressure of 3.4 bar, and it was ethoxylated in the absence or presence of catalysts in varying quantities. Added to the polycondensate mixture within 20 minutes was 1.2 parts by weight of liquid ethylene oxide (1.05 moles per mole of carboxyl group). After achieving an acid number of less than 1, the ethoxylation ended. The mixed adipate polyester of ethylene glycol and 1,4-butanediol was then degassed under a pressure of from 50 to 10 mbar in order to remove excess ethylene oxide and other volatile components and in so doing was allowed to cool to 85° C.

The oxyethylation temperature employed, the type and quantity of catalyst, the oxyethylation time and the characteristic data of the mixed adipate polyester of ethylene glycol and 1,4-butanediol are all summarized in Table 1.

TABLE I

Reaction Conditions and Characteristic Data of the Mixed Adipate Polyether of Ethanediol and 1,4-Butanediol

| Example, Comparative example | Oxyethylation temperature [°C.] | Catalyst type | Quantity [Wt. %]+ | Oxyethylation time [hrs.] | Acid Number | Hydroxyl Number | Iodine Color Number |
|---|---|---|---|---|---|---|---|
| 2 | 80 | Methylimidazole | 0.05 | >8 | 6 | 53.1 | Not determined |
| 3 | 120 | " | 0.05 | 4 | 0.4 | 52.3 | " |
| 4 | 150 | " | 0.05 | 0.5 | 0.5 | 49.8 | " |
| 5 | 150 | " | 0.01 | 3 | 0.2 | 47.5 | " |
| 6 | 150 | " | 0.03 | 2 | 0.3 | 52.3 | " |

TABLE I-continued

Reaction Conditions and Characteristic Data of the
Mixed Adipate Polyether of Ethanediol and 1,4-Butanediol

| Example, Comparative example | Oxyethylation temperature [°C.] | Catalyst type | Quantity [Wt. %]+ | Oxyethylation time [hrs.] | Acid Number | Hydroxyl Number | Iodine Color Number |
|---|---|---|---|---|---|---|---|
| 7 | 150 | " | 0.06 | 0.3 | 0.2 | 52.1 | " |
| 8 | 150 | DBU(1) | 0.01 | 1.5 | 0.2 | 49.9 | <1 |
| 9 | 150 | PDT(2) | 0.03 | 2.0 | 0.4 | 52.3 | <1 |
| B | 150 | — | — | >30 | 5.4 | 51.0 | Not determined |
| C | 150 | Thiodiglycol | 0.5 | 6 | 0.8 | 52.8 | " |

+Wt. %'s based on the weight of the polycondensate.
(1)DBU: Diazabicyclo [5.4.0]undec-7-ene
(2)PDT: Pentamethyl-dimethylenetriamine

EXAMPLE 10

An esterification mixture comprised of 56.12 parts by weight of adipic acid, 10.09 parts by weight of 1,4-butanediol, 21.94 parts by weight of 1,5-pentanediol, and 11.84 parts by weight of 1,6-hexanediol was polycondensed in 7 hours up to an acid number of 11, analogous to the specifications of Example 2.

The polycondensate obtained was allowed to cool to 150° C., the atmosphere was made inert using nitrogen under a pressure of 3.4 bar, and the polycondensate was oxyethylated in the presence of 0.01 parts by weight of methylimidazole, used as a catalyst, with 0.74 parts by weight of ethylene oxide (1.0 mole per mole of carboxyl group) in 2.5 hours.

The resulting polyester polyol had an acid number of 0.1, a hydroxyl number of 72.6, a viscosity at 25° C. of 4665 mPas, and an iodine color number of 1.

EXAMPLE 11

An esterification mixture comprised of 78.92 parts by weight adipic acid, 23.33 parts by weight of 1,4-butanediol, 18.25 parts by weight of neopentylglycol, and 18.29 parts by weight of 1,6-hexanediol, was polycondensed in 14 hours up to an acid number of 7.3, analogous to the specifications of Example 2.

The resulting polycondensate was allowed to cool to 150° C., the atmosphere was made inert using nitrogen under a pressure of 3.4 bar, and the polycondensate was oxyethylated in the presence of 0.02 parts by weight of methylimidazole used as a catalyst with 0.72 parts by weight of ethylene oxide (1.05 moles per mole of carboxyl group) in 2.5 hours.

The resulting polyester polyol had an acid number of 0.4, a hydroxyl number of 60.1, and had a viscosity after 25° C. of 11628 mPas.

The embodiments of the invention in which an exclusive property or privilege is claimed are defined as follows:

1. A process for the preparation of polyester polyols having improved color properties and an acid number less than 1, comprising the molten state condensation of polycarboxylic acids and/or their anhydrides and multivalent alcohols to obtain a polycondensate esterification mixture having an acid number of from about 20 to 5, and oxyalkylating the polycondensate with an alkylene oxide in the presence of a catalytic amount of a tertiary amine selected from the group consisting of N-methylimidazol, diazabicyclo [2,2,2]octane, diazabicyclo[5,4,0]undec-7-ene, pentamethyldiethylenetriamine and mixtures thereof.

2. The process according to claim 1 wherein the polyester polyols have a functionality of from about 2 to 3 and a hydroxyl number of from about 20 to 400.

3. The process according to claim 1 wherein the esterification mixture is polycondensed at a temperature range of from about 150° C. to 250° C.

4. The process according to claim 1 wherein the esterification mixture is polycondensed at a temperature range of from about 160° C. to to 250° C. and atmospheric pressure to yield a polycondensate having an acid number between about 80 to 30 and said polycondensate is subsequently polycondensed under a pressure less than about 500 millibars to yield a polycondensate having an acid number of from about 20 to 5.

5. The process according to claim 1 further including carrying out the esterification of polycondensates in the presence of a catalytic amount of an esterification catalyst selected from the group consisting of tin salts, tetrabutylorthotitanate, and mixtures thereof.

6. The process according to claim 1 wherein said tertiary amine catalyst is present in an amount of from about 0.001 to 1.0 percent by weight based on the weight of the polycondensate.

7. The process according to claim 1 wherein the alkylene oxide is selected from the group consisting of ethylene oxide, 1,2-propylene oxide, and mixtures thereof.

8. The process according to claim 1 wherein from about 1 to 5 moles of the oxyalkylation agent is used per carboxyl group of the polycondensate.

9. The process according to claim 1 wherein said alkoxylation is carried out at temperatures of between about 100° C. to 170° C. and under a pressure of from about 1 to 10 bar.

10. The process according to claim 1, wherein said polycarboxylic acids and/or anhydrides are selected from the group consisting of aromatic dicarboxylic acids, cycloaliphatic dicarboxylic acids, aliphatic dicarboxylic acids having from 2 to 12 carbon atoms in the alkylene radical, and mixtures thereof.

11. The process according to claim 10, wherein said aliphatic dicarboxylic acids and/or anhydrides are selected from the group consisting of adipic acid, glutaric acid, succinic acid, malonic acid, oxalic acid, pimelic acid, subaric acid, azelaic acid, sebacic acid, dodecanedioic acid, and mixtures thereof.

12. The process according to claim 10, wherein said aromatic dicarboxylic acids and/or anhydrides are selected from the group consisting of phthalic acid, isophthalic acid, terephthalic acid, and mixtures thereof.

13. The process according to claim 10, wherein said cycloaliphatic dicarboxylic acids are selected from the group consisting of isomeric cyclohexane dicarboxylic acids, and mixtures thereof.

14. The process according to claim 1, wherein said multivalent alcohols are selected from the group consisting of substituted olefinic unsaturated alcohols, aliphatic dialcohols having from 2 to 12 carbon atoms, glycerin, trimethyloethane, and mixtures thereof.

15. The process according to claim 14, wherein said aliphatic di-alcohols are selected from the group consisting of 1,4-butenediol, diethylene glycol, dipropylene glycol, triethylene glycol, tripropylene glycol, 2,2-dimethyl-1,3-propanediol, 1,3-butylene glycol, 2,2,4-trimethyl-1,6-trimethyl-hexanediol, ethanediol, 1,2-propanediol, 1,3-propanediol, 1,4-butanediol, 1,5-pentanediol, 1,6-hexanediol, 1,8-octanediol, 1,10-decanediol, 1,12-dodecanediol, and mixtures thereof.

16. A polyester polyol having improved color properties and an acid number less than 1 made by the process of claim 1.

17. The process of claim 1, wherein the esterification mixture is polycondensed under reduced pressure.

* * * * *